United States Patent [19]
Korn et al.

[11] Patent Number: 5,400,147
[45] Date of Patent: Mar. 21, 1995

[54] METHOD AND APPARATUS FOR HALFTONE REPRODUCTION OF CONTINUOUS TONE RADIOGRAPHIC IMAGES

[75] Inventors: Donald M. Korn; Richard N. Blazey, both of Penfield, N.Y.

[73] Assignee: Eastman Kodak Company, Rochester, N.Y.

[21] Appl. No.: 866,389

[22] Filed: Apr. 10, 1992

[51] Int. Cl.[6] .................. H04N 1/23; G01D 9/00; G01D 15/10
[52] U.S. Cl. .................................. 358/297; 358/298; 346/135.1; 347/251
[58] Field of Search ............... 358/296, 297, 298, 299; 346/135.1, 76 L

[56] References Cited

U.S. PATENT DOCUMENTS

| | | | |
|---|---|---|---|
| 3,560,994 | 2/1971 | Wolff et al. | 346/135 |
| 3,720,784 | 3/1973 | Maydan et al. | 176/6.6 R |
| 4,001,840 | 1/1977 | Becker et al. | 346/76 L |
| 4,023,185 | 5/1977 | Bloom et al. | 346/135 |
| 4,081,828 | 3/1978 | Jones et al. | 358/75 |
| 4,263,359 | 4/1981 | Kitts, Jr. | 346/135.1 X |
| 4,285,056 | 8/1981 | Bell | 346/135.1 X |
| 4,491,875 | 1/1985 | Kawamara | 358/298 |
| 4,657,840 | 4/1987 | Fisch | 346/76 L X |
| 4,774,522 | 9/1988 | Van Tongeren et al. | 358/296 X |
| 4,796,962 | 1/1989 | DeJager et al. | 350/6.8 |
| 4,864,326 | 9/1989 | Kawamara et al. | 346/108 |
| 4,868,587 | 9/1989 | Loce et al. | 346/157 |
| 4,890,121 | 12/1989 | Hirahara et al. | 346/76 |
| 4,891,714 | 1/1990 | Klees | 358/456 |
| 4,921,320 | 5/1990 | DeJager et al. | 350/6.8 |
| 4,963,990 | 10/1990 | Henderson et al. | 358/298 |
| 4,965,672 | 10/1990 | Duke et al. | 358/298 |
| 4,998,962 | 3/1991 | Edwards | 101/211 |
| 5,241,328 | 8/1993 | Sarraf et al. | 358/298 X |

FOREIGN PATENT DOCUMENTS

WO9012342 10/1990 WIPO .......................... G03C 1/492

OTHER PUBLICATIONS

Maydan, D., "Micromachining and Image Recording on Thin Films by Laser Beams," *The Bell System Technical Journal*, vol. 50, No. 6, Jul.–Aug., 1971, pp. 1761–1789.

Engeldrum, Peter G., "Optimum Density Levels for Multilevel Halftone Printing," *Journal of Imaging Technology*, vol. 31, No. 5, Sep./Oct. 1987, pp. 220–222.

Lama, W., et al, "Hybrid (Gray Pixel) Halftone Printing," *Journal of Imaging Technology* vol. 15, No. 3, Jun. 1989, pp. 130–135.

Primary Examiner—Benjamin R. Fuller
Assistant Examiner—Eric Frahm
Attorney, Agent, or Firm—William F. Noval

[57] ABSTRACT

A multilevel halftone reproduction transparency medium and a method and system for reproducing images thereon. The transparency medium includes a substantially transparent carrier having first and second planar surfaces with ablative dye coatings thereon which are selected to render the medium substantially opaque in non-ablated areas, transparent in fully ablated areas, and semi-opaque in areas where one or the other of the coatings is ablated. A method and apparatus employ the medium to provide binary, trinary and quarternary gray levels in a hybrid halftone printing technique especially useful for printing radiographic images.

4 Claims, 3 Drawing Sheets 3.0 1.5 0 1.5 3.0 3.0 3.0 1.5 0 3.0 3.0 0

3.0 2.0 0 1.0 1.0 3.0 2.0 2.0 0 0 1.0 1.0 1.0 3.0

METHOD AND APPARATUS FOR HALFTONE REPRODUCTION OF CONTINUOUS TONE RADIOGRAPHIC IMAGES

BACKGROUND OF THE INVENTION

1. Technical Field of the Invention

The invention relates to halftone reproduction of continuous tone images, and specifically to black and white radiographic images.

2. Background Art

Primary radiographic images are conventionally created by exposing a black and white photographic film or plate to an X-ray source and an interposed sample. The more absorbent parts of the sample throw shadows onto the photographic film or plate, and they appear less dark when the film or plate is developed. A radiograph of the human body, for example, shows the bones whiter than surrounding flesh because bones contain the element calcium, which has a relatively high atomic number. Abnormalities and foreign bodies are readily visible, and appropriate therapeutic action can be taken. Internal organs generally absorb X-rays to about the same extent as the surrounding flesh, but they can be shown up on a radiograph by concentrating material of greater absorbing power into the organ.

Radiography also has important industrial uses in locating internal defects in materials in creating three-dimensional images through stereoscopy, and in studying the three-dimensional structure of solids through tomography.

In all these applications, the exposed photographic film or plate is developed and employed diagnostically in medical applications and for quality control, record-keeping and scientific investigation in medical, industrial and scientific applications. Depending on the exposure radiation, the nature of the sample and the photochemistry of the photographic medium and its processing, results in a film radiograph that may possess a continuous tonal gradation in transmissivity to light extending between fully transparent (light) and fully opaque (black). The accurate reproduction of copies of the developed image is dependent on the ability of the techniques employed to faithfully reproduce the gray level gradation between the black and white extremes in the original radiographic image. Direct copying of the image has typically been attempted by photographic and xerographic techniques which rely upon exposure of a second photographic medium or xerographic drum to light transmitted through or reflected by the original image. Losses in tonal density and balance may occur, particularly in the xerographic reproduction process. In the photographic reproduction process, it is still necessary to develop the copy.

More recently, radiographic film images have been scanned by laser scanners to develop a digitized image field of the tonal density of the original image and to store the digitized image for transmission to remote locations and/or subsequent reproduction of the image. The digitization and storage of the image field also provides a back-up to the original which may be lost, particularly if it is sent to another location to be viewed by specialists in the field of interest.

In addition, digitally captured diagnostic images are generated in the first instance by computer automated tomography (CAT), magnetic resonance imaging (MRI), ultrasound, and other tomographic and stereoscopic scanners. Such digitally captured diagnostic images are conventionally stored in magnetic tape or optical disk archives and displayed on high resolution monitors for primary diagnosis in medical applications and quality inspection, scientific investigation and the like in other applications. The archives inherently provide the back-up to safeguard against loss and reduce the need for photographic film processing equipment and storage space for the resulting film radiographs. In addition, the digitally captured diagnostic images allow for telecommunications of these images from location to location.

The Kodak Ektascan ® Image Link products represent a system that provides the generation, archiving and communications of such digitally captured diagnostic images captured from magnetic resonance imaging (MRI), computer automated tomography (CAT), and other modalities, such as images acquired from film radiographs through laser scanning. In such systems, images can be stored and retrieved with advanced optical disk archiving, and manipulated to suit viewing requirements and preferences. The images can be viewed on high resolution video monitors and recorded with full fidelity on film using laser printing and reproduced on paper or a transparent media with high quality thermal printing.

In this context, it is desirable to improve the reproduction of images represented by either an original film radiograph that is digitally captured through laser scanning or original digitally captured diagnostic images or other digital images.

As is well known, conventional, binary, halftone black and white simulation of continuous tone images is accomplished by reproducing the image with black or white dots of various sizes. Depending on the convention employed, the dots may constitute pixels or subpixels arranged in cells of m lines and n columns, where each cell contains $m \times n$ pixels each exposed to black (opaque) or white (transparent). After printing these cells on the print medium, the eye, not being sufficiently microscopic to see the individual pixels, blends them into gray level gradations simulating the continuous tone image being reproduced. Naturally, the degree to which the size of the pixels can be reduced enhances the degree to which the halftone reproduction faithfully reproduces the continuous tone original image.

Reduction of pixel size involves increased cost and complexity of the printer systems. When assessing quality of the printer, two measures are important; the number of halftone cells per linear inch (halftone frequency) and the number of distinguishable gray steps. In print media, high quality magazines typically use 150 cells per inch (cpi). The needed number of gray steps depends on the eye's ability to distinguish closely spaced grays. For good quality print media, it has been found that about 100 gray steps are necessary. In a binary printer, the maximum number of gray steps per cell is $m \times n + 1$. Achieving both a high halftone frequency (150+cpi) and 100 or more gray steps in each cell is difficult and costly with a binary printer.

To meet such gray level requirements, it has been proposed to employ a hybrid halftone technique consisting of trinary or quarternary (3 or 4 gray level) pixels per cell in the paper "Hybrid (Gray Pixel) Halftone Printing," *Journal of Imaging Technology*, Vol. 15, No. 3, pp. 130–135, June, 1989, by W. Lama, et al. These authors assert that a trinary printer (black, white and one gray pixel level) can produce a vastly greater number of output gray steps for a given halftone cell size. Furthermore, in a quarternary printer (two intermediate gray pixel levels) the output steps can approach a continuum as viewed by the human eye. It is important to note that the number of gray steps alone does not determine the gray scale quality of the printer. The gray steps must also be arrayed properly along the output density scale, and the maximum step size should be reduced below the perceptible limit.

The authors of this paper and the paper entitled "Optimum Density Levels for Multilevel Halftone Printing," (P. G. Engeldrum, *Journal of Imaging Science*, Vol. 31, No. 5, pp. 220-222, Sept./Oct. 1987) present intermediate density level values optimized for print media.

One problem that can result with using halftoning techniques to reproduce gray levels is image artifacts, in particular, contouring. Contouring is an artifact that is the result of the observer being able to clearly distinguish the boundary between pixels that represent two adjacent (in gray level space) gray levels. Digital halftoning techniques are discrete in representing gray levels, in that a gray level is composed of a discrete number of black dots and white dots. Two adjacent gray levels are represented typically by one gray level having one more black dot than the other. Particularly at high densities, adjacent gray levels can be noticeable to the eye, resulting in contouring.

Another problem that can plague halftoning processes with photosensitive media is lack of uniformity of the photosensitive media coatings. Lack of uniformity of coating layers can result in the visibility of the variation as an image artifact.

In the context of printing reproductions of original film radiographs or digitally captured diagnostic images, it is desirable to make that reproduction on a transparency so that the image may be viewed by transmitting light through it in the conventional fashion while avoiding these problems and advantageously avoiding post-imaging film processing.

SUMMARY OF THE INVENTION

It is therefore an object of the present invention to make high quality transparency reproductions of film radiographs or digitally captured diagnostic images employing halftone reproduction techniques and an improved reproduction medium for improved tonal density characteristics of the reproduced image.

It is a further object of the present invention to eliminate contouring artifacts in halftoned images by furnishing a method of providing smaller density differences between adjacent gray levels that are represented by halftones.

It is a further object of the present invention to provide a halftoning method that is more tolerant of coating artifacts in the imaging media by providing two imaging layers that average any coating artifacts.

It is a further object of the present invention to employ digitally controlled laser scanning techniques to expose a transparency-based medium with high density halftone imaging techniques for generating high quality gray level electronically reproduced images without introducing contour artifacts.

In accordance with the present invention, a transparent film base or carrier is provided that is coated with ablative semi-transparent material on both sides of the carrier that may be exposed on each side to digitally controlled radiation which selectively ablates the coatings to provide up to four optical densities at each pixel of the image.

The present invention thus involves high quality halftone image reproduction of digitally captured images on a transparency medium which is practiced in a method comprising the steps of:

providing a transparent carrier medium with first and second ablative coatings having respective first and second optical densities to light transmittable through the transparent medium;

providing a scanning beam of ablative radiation;

scanning the radiation beam in successive line scans across said first coating in an image field while modulating the intensity of the radiation as a function of the digitized image information of each line scan in order to ablate or leave intact the first coating at each image pixel scanned; and repeating the above steps with respect to the second coating to form up to four optical densities of each image pixel in the image field.

As indicated above, and in more specific terms, the method and apparatus includes the use of first and second optical dye coatings that may be ablated selectively by scanning beam radiation which is modulated on or off at each pixel location and focused on one or both of the coatings, depending on the digitized original image density of that pixel. The first and second ablative dye coatings may be of the same or different composition and possess the same optical density or two different densities. In any case, the ablation of the first and second dye coatings at the pixel results in a totally transparent pixel. Conversely, not ablating the dye coatings results in a totally opaque pixel due to the summation of the densities of the two dye coatings. In the former case, the ablation of one of the dye coatings leaving the other intact results in a mid-gray scale optical density. Finer gradation is achieved in the second example where the dye coatings may be selected to provide one-third and two-third gray scale densities, thus resulting in four possible optical densities at each pixel.

With the method and apparatus of the present invention, high quality halftone images may be achieved by the selective ablation of the coating(s) at each pixel as described above without requiring further processing to fix the image. The method and apparatus of the present invention, when compared with previously proposed prior art methods, has the advantages of efficiency, greater economy, the elimination of the previously required photographic developing step, and the achievement of improved tonal density characteristics.

BRIEF DESCRIPTION OF THE DRAWINGS

The above and other objects, features and advantages of the present invention will be more apparent from the following description presented in conjunction with the accompanying drawings in which like reference numerals designate like parts throughout the figures thereof, and wherein.

The drawings are not necessarily to scale.

DETAILED DESCRIPTION OF THE PREFERRED EMBODIMENTS OF THE INVENTION

Figure 1:
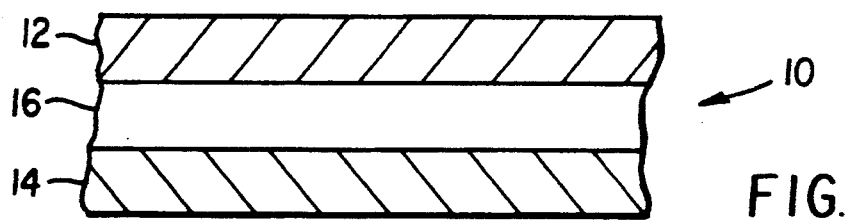
FIG. 1 is a cross-section representation of a transparent medium coated with first and second ablative dye coatings.

The preferred embodiments of the present invention involve the use of dye coatings on a transparent carrier sheet, placed on both sides of the sheet, where the dye coatings are selected to be vaporized by radiation of a predetermined wavelength focused on the coating. FIG. 1 illustrates in partial cross-sectional view a print medium or receiver 10 having first and second dye coatings 12 and 14 on its opposite planar surfaces. The transparent medium 16 may be formed in sheets or in a continuous web and preferably is fabricated of ethylene terepthalate (commercially known as Mylar ®, a trademark of Dupont) having a thickness in the range of 0.003–0.012 inch. The dye coatings 12 and 14 of the FIG. 1 embodiment are preferably formed of 4-phenylazo-1-napthylamine and applied to the opposite surfaces of carrier 10 by vacuum evaporation, as taught, for example, in U.S. Pat. No. 4,023,185. Alternatively, the dye coatings 12 and 14 may be formed of neutral combinations of two or more dyes, together with an IR-absorbing dye in a binder, and may be applied by solvent coating.

Other substrates and ablative coatings are disclosed in PCT Publication WO 90/12342 and U.S. Pat. Nos. 3,560,994 and 3,720,784.

In the FIG. 1 embodiment, the coatings 12 and 14 have equal optical densities and may be ablated by incident laser beam radiation having a wavelength of 820 nm and an intensity, which when absorbed by the dye within the dye coating 12 or 14, causes the coating to vaporize due to the sudden and intense heating of the dye. Such dye coating materials and the process of thermal ablation are taught, for example, in U.S. Pat. No. 4,023,185, incorporated herein by reference in its entirety.

Figure 2:
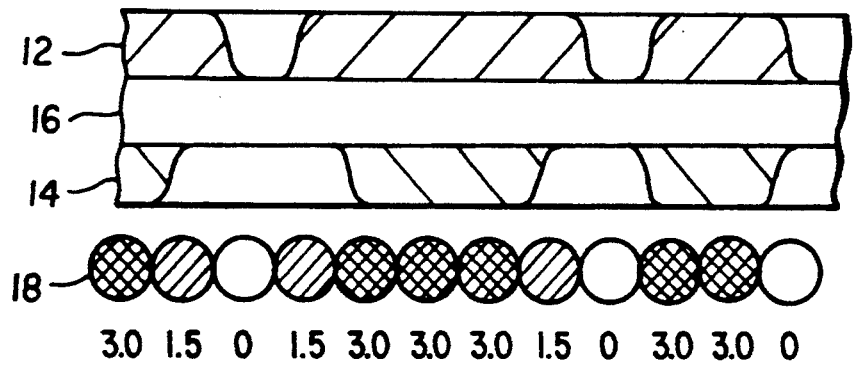
FIG. 2 is a cross-sectional view of the coated medium of FIG. 1 where the coatings have been ablated by ablative radiation applied to the two coatings and the representation of the resulting optical density of each image pixel.

Turning now to FIG. 2, a cross-sectional view of the medium 10 of FIG. 1 ablated by a laser beam radiation selectively applied to each coating 12, 14 illustrates the variation in optical density in a partial scanned line 18. The densities are illustrated by the circular dots representing pixels or subpixels of a scan line 18, which correspond to an ablation line pattern in layers 12 and 14 shown immediately above the line of dots 18. The dots have an optical density of either 3.0 (black), 1.5 (mid-gray), or 0 (transparent), depending on whether or not both coating layers 12 and 14 are intact, a single layer is vaporized away, or both layers are vaporized away, respectively. Thus, as the laser beam is scanned in a line in the known fashion across the medium, it is turned on and off or high and low in intensity, and when on or high, vaporizes the coating 12 or 14, the beam is focused on in the small area defining the dot size of the pixels.

For example, in the layer 12 of FIG. 2, the laser beam was turned on or high at the third and ninth dot positions in scanning from left to right to ablate the coating 12 and expose the transparent carrier 16 thereat. Similarly, when the laser beam was focused on the dye coating 14 and turned on or high, it vaporizes coating 14 and exposes transparent carrier 16. The optical density or light transmissivity therefore reflects the combined effects of the ablation of none, one or both of the coatings 12 and 14 at each dot position. Thus, the pattern illustrated by the dots in line 18 of FIG. 2 and the depressions indicating ablation of the coatings 12 and 14 illustrate that three optical densities may be obtained at each dot position by the simultaneous or sequential ablation of the coatings 12 and 14 by digitally encoded scanning laser beams.

In line 18, the optical densities from left to right are summarized by the following Table I:

TABLE I

| 12 | 14 | 18 |
| --- | --- | --- |
| 1.5 | 1.5 | 3.0 |
| 1.5 | 0 | 1.5 |
| 0 | 0 | 0 |
| 1.5 | 0 | 1.5 |
| 1.5 | 1.5 | 3.0 |
| 1.5 | 1.5 | 3.0 |
| 1.5 | 1.5 | 3.0 |
| 1.5 | 0 | 1.5 |
| 0 | 0 | 0 |
| 1.5 | 1.5 | 3.0 |
| 1.5 | 1.5 | 3.0 |
| 0 | 0 | 0 |

As can be seen from the illustration of FIG. 2, it may be advantageous to process the digitally captured image line scan data to provide the high and low or on and off laser beam image intensity commands such that the achievement of the 1.5 mid-gray level density at each dot is accomplished by ablation of only one of the layers, such as layer 14, rather than by randomly ablating one or the other.

Figure 3:
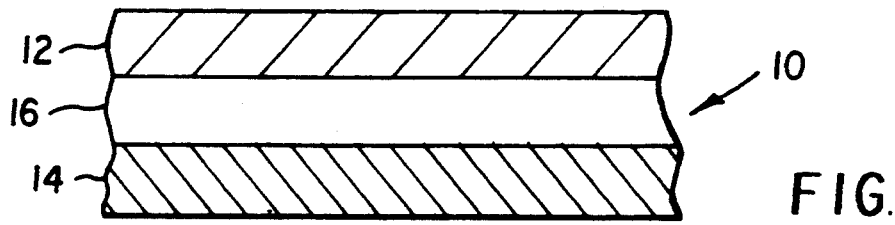
FIG. 3 is a cross-sectional view of a further medium coated with ablative dye coatings on each side, where the optical densities of the coatings differ from one another.

Turning now to FIG. 3, it illustrates in cross-section an alternative embodiment of the present invention involving the selection of dyes for the dye coatings 12 and 14 that provide optical densities in a 2:1 ratio, such that the optical density of layer 14 is twice the optical density of layer 12 and their combined optical density add up to about 3.0. Thus, the selective ablation of one or the other of the layers 12 or 14 will provide at least two intermediate gray levels specified as 1.0 and 2.0 in this exemplary embodiment, rather than the single gray level of the embodiment of FIGS. 1 and 2.

Figure 4:
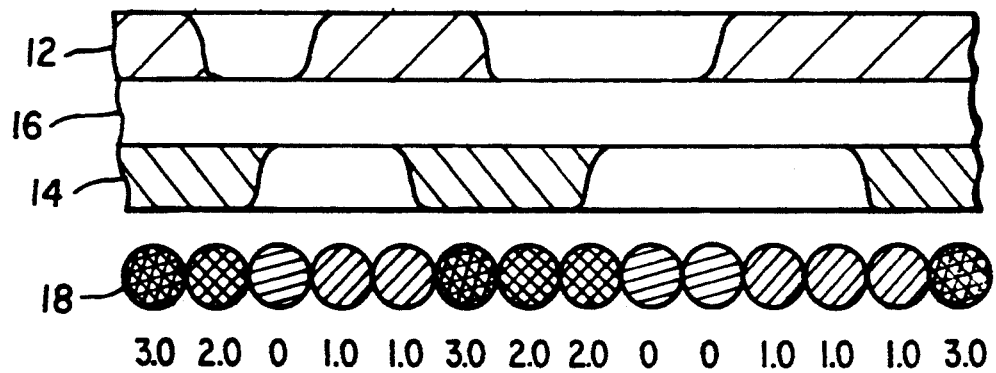
FIG. 4 is a cross-sectional view of the coated medium of FIG. 3 with ablative dye coatings on each side, where the optical densities of the coatings differ from one another.

The ablation of the coatings 12 and 14 of the exemplary embodiment, and the resulting densities of the scanning line 18 of the embodiment of FIG. 3 are depicted in FIG. 4. In this embodiment, it is necessary to include the scanning signal to selectively ablate either the coating 12 or the coating 14 to achieve the two intermediate gray level densities. Table II summarizes the densities of the dots of the scanned line 18 of FIG. 4 as follows:

TABLE II

| 12 | 14 | 18 |
| --- | --- | --- |
| 1.0 | 2.0 | 3.0 |
| 0 | 2.0 | 2.0 |
| 0 | 0 | 0 |

TABLE II-continued

| 12 | 14 | 18 |
|---|---|---|
| 1.0 | 0 | 1.0 |
| 1.0 | 0 | 1.0 |
| 1.0 | 2.0 | 3.0 |
| 0 | 2.0 | 2.0 |
| 0 | 2.0 | 2.0 |
| 0 | 0 | 0 |
| 0 | 0 | 0 |
| 1.0 | 0 | 1.0 |
| 1.0 | 0 | 1.0 |
| 1.0 | 0 | 1.0 |
| 1.0 | 2.0 | 3.0 |

The above-described examples of FIGS. 2 and 3 are described as having arbitrarily designated numeric values for the differing density or opacity coatings 12 and 14. It will be understood that the relative density or opacity values may be selected with differing relative values to achieve discriminable gray levels in the fashion described in the above-referenced articles dealing with reflectance multilevel halftone printing. The relative densities or opacities may be selected empirically with respect to the specific dyes in the coatings to provide the optimum gray step gradation for the viewer of the transparency. In other words, the 0, 50%, 100% and 0, 33%, 67%, 100% gray step gradations depicted and described above may be varied in the fashion taught in the above-referenced articles.

Many electronic systems that manipulate images in digital form use techniques to convert images with multiple gray levels into images with two gray levels as taught, for example, in U.S. Pat. No. 4,891,714, incorporated herein by reference in its entirety. Also, halftoning systems in which input image data are converted into a halftone representation in which each of the picture elements, or "micropixels," may have either three, or four density levels, yielding a much larger number of output gray levels, are known and are disclosed, for example, in U.S. Pat. No. 4,868,587.

Turning now to mechanisms for scanning the ablative coatings 12 and 14 with superimposed, properly registered and focused laser scanning beams, it will be understood that a number of laser printing technologies may be employed to effect proper registration. For example, it is contemplated that recording medium 10 may be fitted on a platen roller driven by a stepper motor to advance the medium with respect to a scanning laser beam focused on the first ablative coating 12 to ablate it in accordance with bi-level line scan image information until the digital image information is recorded on the first coating 12. Thereafter, the medium 10 which would be in the form of a sheet may be removed from the platen, turned over and fixed again in position so that the second ablative coating 14 may be scanned and selectively ablated by the scanning laser beam radiation. In this fashion, registration of the successive line scans may be achieved. A suitable optical scanner of this type is disclosed in commonly assigned U.S. Pat. Nos. 4,921,320 and 4,796,962, both incorporated herein by reference in their entirety.

Figure 5:
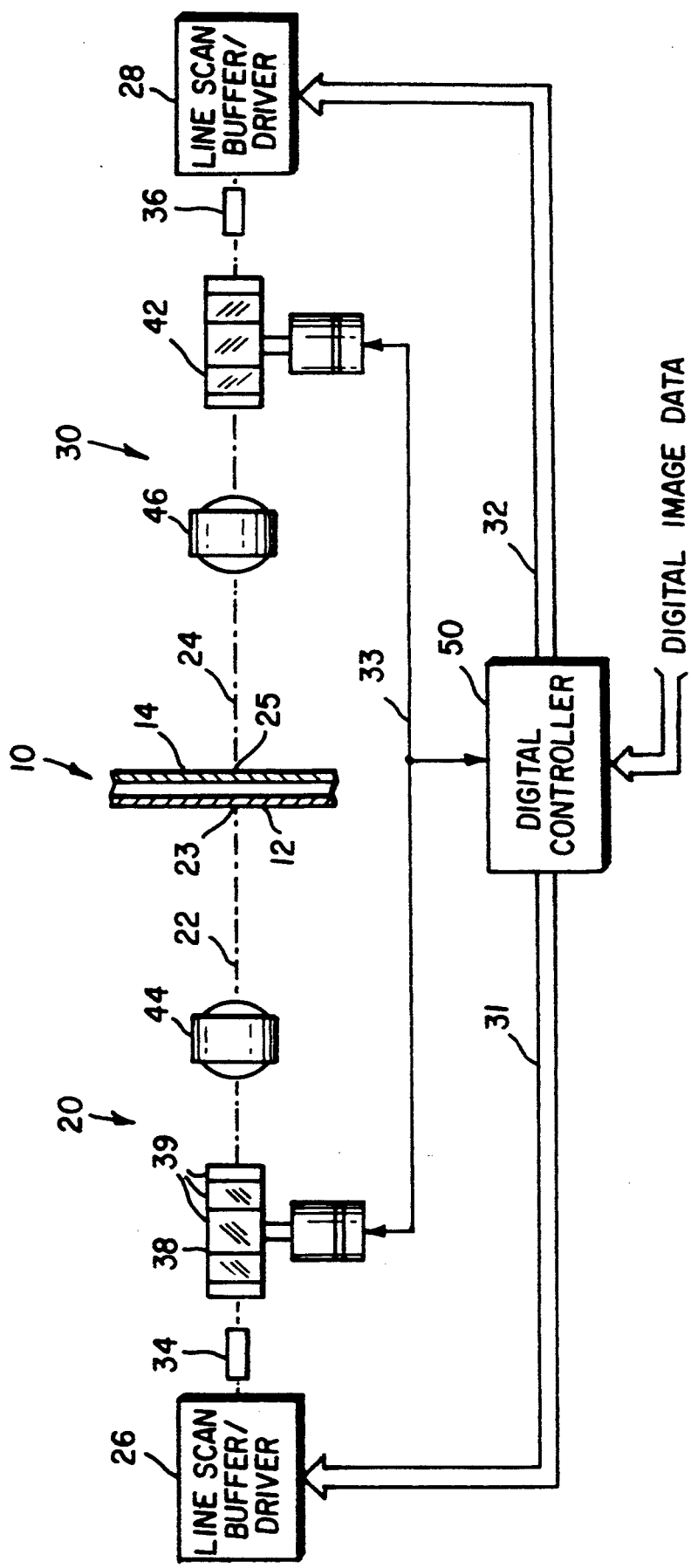
FIG. 5 is a perspective illustration of a scanning mechanism for scanning ablative energy laser beams across image lines of the image field to be reproduced on the first and second coatings.

It may also be possible to simultaneously focus scanning laser beam radiation on the dye coatings 12 and 14 by employing a double set of pinch rollers (not shown), one set displaced from the other on either side of the/-scanning station, to hold and transport the ablative dye coated medium 10 as depicted in FIG. 5. FIG. 5 is a schematic illustration of a system for exposing the first and second ablative dye coatings 12 and 14 of the receiver medium 10 by a pair of laser scanning systems 20 and 30 which provide synchronized laser scanning beams 22 and 24 focused on the first and second ablative layers 12 and 14 in a scanning station, where the transport mechanism stepwise advances the medium 10 at the end of each scanning line as is well known in the scanning/printing art.

The scanners 20 and 30 are operated under the control of a microprocessor based printer controller system 50 of the type disclosed, for example, by the '714 or the '587 patent to provide line scan data on data buses 32, 33 to line scan buffer drivers 26 and 28, respectively. The data in the line scan buffers 26 and 28 turn the lasers 34 and 36, respectively, on or off while deflecting mirrors 38 and 42 rotate in synchronism with each other and the line scan to direct the modulated laser beams 22 and 24 through optical systems 44 and 46, respectively, and to the first and second ablative dye coatings 12 and 14, respectively. The digital controller 50 also synchronizes the rotation of the polygon-shaped mirrors 38 and 42. The system depicted in FIG. 5 is merely illustrative of the components which would be employed in conjunction with the printer controller and driving mechanism as known in the prior art to either simultaneously or sequentially ablate the coatings 12 and 14.

Figure 6:
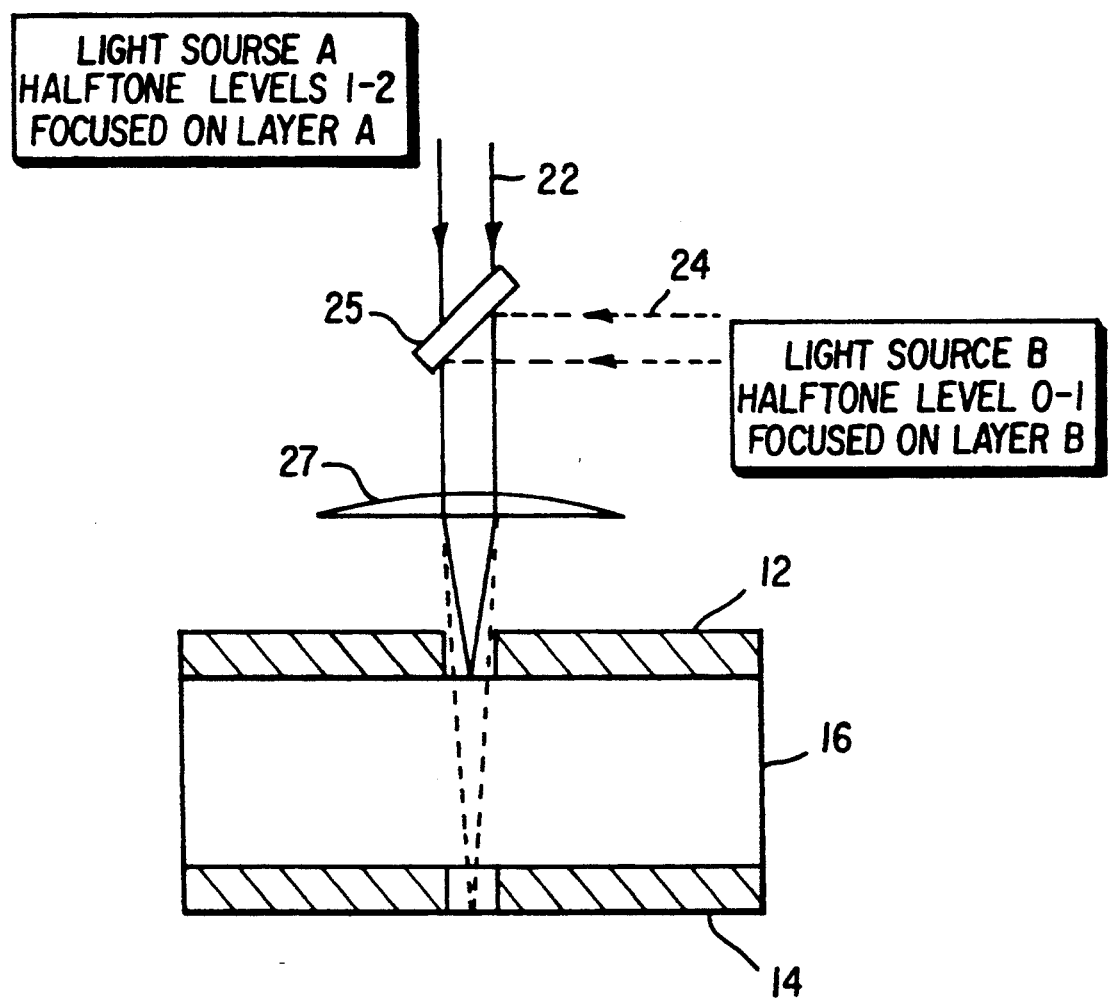
FIG. 6 is a simplified schematic illustration of a further optical scanning system for focusing the scanning ablative energy laser beams onto the ablative dye coatings.

Turning now to FIG. 6, it illustrates a variation on the system of FIG. 5 for focusing the scanning beams 22 and 24 onto the first and second coatings 12 and 14 from one side of the media 10. In this embodiment, a beam splitter 25 is employed with a separate focusing system for each beam to focus each beam's energy on the respective layers. The carrier 16 is selected of a substantially transparent material that is a poor absorber and conductor of heat generated by the laser beam pssing through it and focused on layer 14. In any of the described embodiments, the laser beam must be sharply focused on the respective coating to raise its temperature to heat and ablate the dye material in the discrete pixel area. The high numerical aperture of lens 27 is selected in conjunction with the other focusing lens (not shown) and positioned to insure that the beam 22 focused on coating 12 is too diffuse at coating 14 to cause that layer to ablate. In FIG. 6, halftone levels 0 and 1 are imaged on coating 14 and halftone levels 1 and 2 are imaged on coating 12.

While the specific embodiments of the medium have only two ablative dye coatings 12, 14, each on one side of the carrier 16, it will be understood that additional coatings may be employed to achieve further gray-level density gradation.

The invention having been described in detail with particular reference to certain preferred embodiments thereof will be understood to encompass variations and modifications thereof and equivalents thereto within the spirit and scope of the invention defined by the appended claims.

What is claimed is:

1. A method of halftone image reproduction of images on a transparency medium comprising the steps of:
    providing transparency medium including a substantially transparent carrier with a first ablative coating and a second ablative coating having respective first optical density and second optical density to light transmittable through said medium;
    providing a scanning beam of ablative radiation having variable intensity;

scanning the beam of ablative radiation in successive line scans of sequential pixels of image information across said first ablative coating in an image field while modulating said intensity of said radiation beam as a function of the image information of each line scan in order to ablate or leave intact said first coating at each of said sequential pixels scanned; and repeating the above steps with respect to said second coating to provide halftone optical of said sequential pixels.

2. The method of claim 1 wherein said first ablative coating and said second ablative coating have substantially equal optical density.

3. The method of claim 1 wherein said first ablative coating and said second ablative coating have differing optical densities.

4. The method of claim 1 wherein the repeating step is performed by scanning each of said first ablative coating and said second ablative coating with said beam of ablative radiation to simultaneously ablate or leave intact the said first ablative coating or said second ablative coating at each of said sequential pixels in a line scan.

* * * * *